United States Patent [19]

Costes et al.

[11] Patent Number: 5,135,706

[45] Date of Patent: Aug. 4, 1992

[54] DEVICE FOR MEASURING RADIOACTIVE CONTAMINATION ON LARGE PIECES

[75] Inventors: Jean-Raymond Costes, Rochegude; David D. Vieira, Puyricord; Gerald Imbard, Avignon, all of France

[73] Assignee: Commissariat A L'Energie Atomique, Paris, France

[21] Appl. No.: 601,265

[22] Filed: Oct. 19, 1990

[30] Foreign Application Priority Data

Oct. 20, 1989 [FR] France ............................... 89 12776

[51] Int. Cl.$^5$ .............................................. G21C 17/00
[52] U.S. Cl. ................................... 376/245; 376/157; 376/159; 376/253; 376/254; 250/358.1; 250/366; 250/367; 250/369; 250/394
[58] Field of Search ............... 376/245, 159, 157, 253, 376/254; 250/336.1, 394, 385.1, 366, 367, 369, 358.1, 359.1

[56] References Cited

U.S. PATENT DOCUMENTS

| | | | |
|---|---|---|---|
| 2,976,421 | 3/1961 | Bayfield | 250/83.6 |
| 3,255,352 | 6/1966 | Johnston | 250/83.3 |
| 3,654,465 | 4/1972 | Platz et al. | 250/71.5 S |
| 3,832,545 | 8/1974 | Bartko | 250/312 |
| 3,842,278 | 10/1974 | Noakes | 250/369 |
| 3,955,088 | 5/1976 | Muehllehner et al. | 250/363 S |
| 4,049,966 | 9/1977 | Luitwieler | 250/369 |
| 4,342,916 | 8/1982 | Jatteau et al. | 378/4 |
| 4,349,112 | 9/1982 | Wilks et al. | 209/538 |
| 4,571,492 | 2/1986 | Kane et al. | 250/303 |
| 4,617,169 | 10/1986 | Bradzinski et al. | 376/257 |
| 4,626,401 | 12/1986 | Oakley et al. | 376/245 |
| 4,756,866 | 7/1988 | Alvarez | 376/157 |
| 4,897,549 | 1/1990 | Zerda et al. | 250/358.1 |

FOREIGN PATENT DOCUMENTS 1030203  5/1966  United Kingdom .

Primary Examiner—Brooks H. Hunt
Assistant Examiner—Chrisman D. Carroll
Attorney, Agent, or Firm—Pearne, Gordon, McCoy & Granger

[57] ABSTRACT

The invention makes it possible to measure the degree of radioactive radiation emitted by large pieces. It includes two large gamma ray detectors (12A, 12B) placed opposite each other and whose spacing is adjustable. They are completed by a photoelectron multiplier (14A, 14B). The piece (2) to be measured is suspended so as to be brought between the two detectors (12A, 12B). The positioning of these detectors is obtained with the aid of a computer and a system (22) for recognizing the shape of the piece (2) functioning with the aid of optical clip-on lenses. The fact that the two detectors are position-adjustable makes it possible to take account of the shape of the piece to be measured. An application is the recovery of materials originating from nuclear installations with the view to re-using the materials.

7 Claims, 3 Drawing Sheets

DEVICE FOR MEASURING RADIOACTIVE CONTAMINATION ON LARGE PIECES

FIELD OF THE INVENTION

The field of the invention concerns control of the radioactive contamination of contaminated materials. The invention can be used in nuclear energy applications, when dismantling nuclear installations, during maintenance and keeping in repair of said installations and when these installations are moved. The purpose of these operations is to recover the metals involved so as to render them available for new usage in public applications.

BACKGROUND OF THE INVENTION

In fact, when dismantling a nuclear reactor, if it is desired to re-use materials, such as the metals forming part of the installation, it is necessary to establish that the radioactivity percentage of the waste to be removed does not exceed the limit conforming to certain regulations. In this case, this may require a radioactivity of less than 1 Becquerel per gram (1 Bq/g) to achieve this objective, it may also be necessary to observe the ALARA (As Low As Reasonable Achievable) principle which consists of maximum decontamination prior to recovery, as opposed to the fusion of contaminated metals.

Up until now, the control of radioactive contamination is effected with the aid of detectors operational over several square centimeters. The control of contamination on large pieces with the aid of this type of detector requires that these detectors be moved over the entire surface of the piece and a measurement be made after each movement. It is then essential to process the results of each punctual measurement. When dismantling a nuclear reactor where the weight of the material to be removed may exceed four hundred tons, such a conventional method concerning the entire surface of the waste proves to be too random and expensive.

SUMMARY OF THE INVENTION

The object of the invention is to overcome these drawbacks by providing a device for measuring the radioactive contamination on large pieces.

Such a device makes it possible to classify run off pieces whose weight exceeds several tens of kilograms. The control time for these pieces must not exceed a quarter of an hour.

To this effect, the main object of the invention is to provide a device to measure the radioactivity of large pieces via the detection of gamma radiations. The device includes mainly at least two detection units, each composed of a gamma radiation detector with a large detection surface delivering a number of photons proportional to the number of gamma radiations detected, the two detectors being placed opposite and parallel to each other spaced from each other by a distance able to be adjusted according to the width of the piece to be measured.

The device also includes a device for positioning the detectors according to the piece to be measured and constituted by a bearing structure, and a device for lifting and moving the piece to be measured so as to have it pass between the two detectors and thus enable the long pieces to be measured by running them off. The adjustable position of the detectors allows them to be adapted to the various shapes of the pieces to be measured.

According to one aspect of the invention, the two photoelectron multipliers are mounted head-to-tail with respect to each other. This makes it possible to take account of the possible asymmetry of the detectors.

According to one aspect of the invention, the two detection units each include at least one photoelectron multiplier receiving the photons of the detector and delivering an electric signal characteristic of the measurement.

The invention is advantageously completed by a computer.

This computer may include means for taking into account the dimensional characteristics and the thickness of the pieces and the instantaneous spacing of the detectors.

One preferred embodiment of the invention provides a system for recognizing the piece at the input of the detectors so as to allow for a more operational use of these detectors. It is preferably constituted by a first optical clip-on lens perpendicular to the distance covered by the piece and by two optical clip-on lenses parallel to each other and each integral with one section of the bearing structure.

The computer is able to calculate the distribution profile of the radioactivity of the piece according to the movement of the latter and furnish the mean surface activity on the basis of the data of the recognition system.

BRIEF DESCRIPTION OF THE DRAWINGS

The invention and its technical characteristics shall be more readily understood from a reading of the following description accompanied by the figures listed below.

DETAILED DESCRIPTION OF THE PREFERRED EMBODIMENTS

Figure 1:
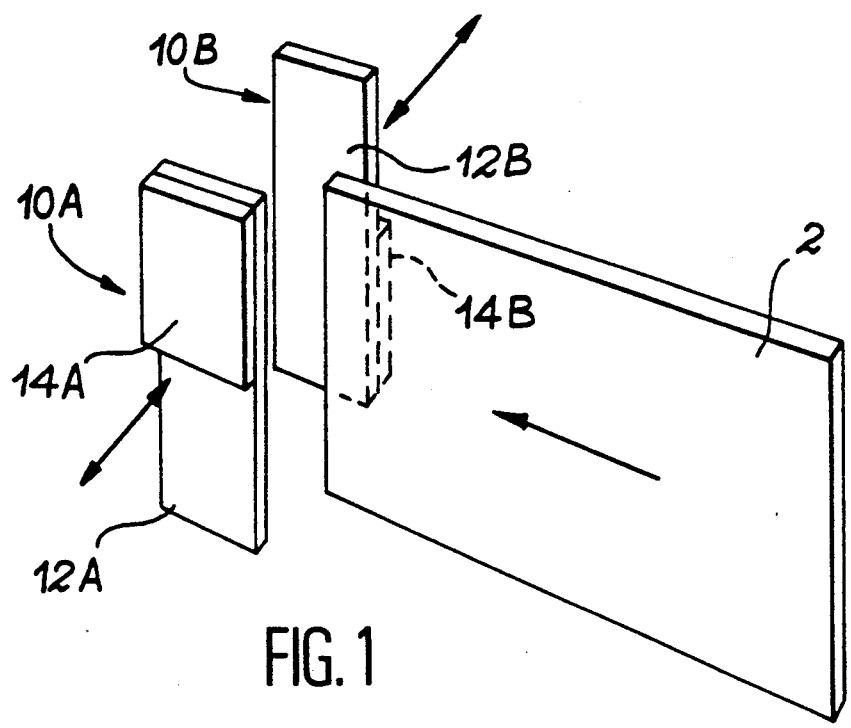
FIG. 1 is an explanatory diagram of the detection used in the device of the invention.

According to the principle of the invention, FIG. 1 shows a piece 2 passing between two sets of detectors 10A and 10B. The piece 2 is a steel sheet two meters long. However, the device of the invention may carry out measurements on pieces exceeding five hundred kilograms and inscribed in a parallelpiped with dimensions of $1 \times 1 \times 2$ meters. In fact, most of the pieces to be measured are waste products made up of portions of large pipes cut along their generators. The diameter of these pipes may reach 1.6 meters. In this type of waste product, it is the internal face of these pipe portions which is contaminated. Other waste products may be more compact objects, such as portions of large valves or bellows.

The two detection units 10A and 10B each have, as a measuring member, a gamma radiation detector 12A and 12B. Each of these detectors is at least 1 meter high and has a width of equal to about 0.5 meters. They are disposed upright and may be spaced from each other by at least 1 meter. Thus, their height may enable pieces to be measured whose height is about 1 meter, the spacing of these detectors enabling them to measure pieces whose width is also about 1 meter. These gamma radiation detectors 12A and 12B capture the radiations for several seconds and furnish a number of photons proportional to the number of radiations detected.

In order to count the number of gamma radiations emitted by the piece 2, the number of photons delivered by each of the detectors 12A and 12B is assessed with the aid of the photoelectron multipliers 14A and 14B respectively associated with the detectors 12A and 12B. Each photoelectron multiplier 14A and 14B delivers an electric signal characteristic of the measurement.

So as to measure the radioactive contamination of the piece to be measured, it is essential to know the shape and in particular the thickness of the piece 2 to be measured and the distance separating this piece from the detectors 12A and 12B. These parameters are introduced into a computer for controlling and processing the electric signal, this computer being used to control the device and provide the result of the measurement. The fact of knowing the thickness of the piece makes it possible to take account of self-absorption due to the thickness of this piece and the shadow effect due to the background noise created by introducing the mass of the waste product.

In order to compensate for a slight loss of sensitivity from top to bottom, the photoelectron multipliers 14A and 14B are mounted head-to-tail.

The two detectors 12A and 12B are obviously placed opposite and parallel to each other. This makes it possible to minimize the measuring deviations due to the distribution heterogeneity of the operation. In fact, if a detector is relatively close to one point of the piece, its first point can be seen to be relatively near. On the other hand, a second point is seen to be more distant with respect to the near point. As the second detector is placed facing the first one on the other side of the piece, this second detector could clearly view the second point distanced from the first detector, whereas it shall be unable to clearly view the first point near to the first detector. The use of two detectors thus makes it possible to take account of the shape of the piece to be measured.

In order to attenuate the background noise due in particular to natural radioactivity, the active sections of the detectors 12A and 12B are covered with a radiation shielding. It is also preferable to electronically limit the operational range of the detectors. This makes it possible to take account of the spectrum of the background noise existing on the site.

The passage of a relatively wide waste product between the two detectors 12A and 12B results in a reduction of the background noise, known as a shadow effect. This effect conceals one part of the contamination deposited on the waste product to be measured. Thus, it is important to take account of the thickness of the piece to be measured. This thickness is also used to take account of the self-absorption of radiations.

The device of the invention is preferably monitored by a control computer.

So as to exploit the various parameters, the computer is used to process the electric signal of the measurement. In its calculation program, the system includes means for taking into account these various phenomena inherent to this type of measurement. All the calculation parameters are provided by the detectors 12A and 12B and a shape recognition system. The computer may also calculate the distribution profile of the radioactivity according to the movement of the piece.

Figure 2:
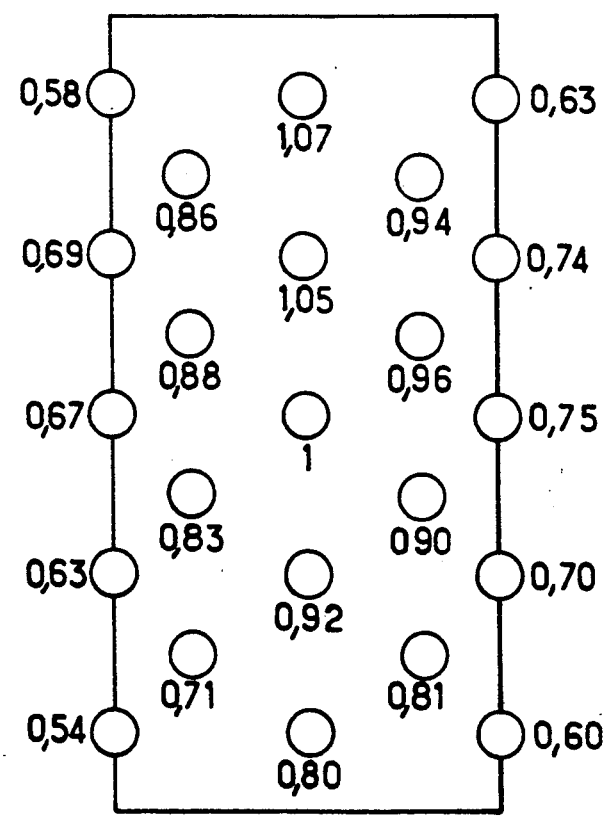
FIG. 2 is an explanatory graph relating to the results obtained at various points situated between the detectors in one particular detection case.

FIG. 2 shows a cartograph showing the sensitivity of a detector effected with the aid of a cesium source 137 collimated by lead. This shows a reduction of sensitivity on the vertical edges (at least 0.54 on one edge as against 1 at the center). This reduction is taken into account in the embodiment of the device of the invention, since the detectors are placed vertically and the pieces to be measured are run off horizontally.

The various characteristics of the device of the invention make it possible to have a control volume where the gamma photons are received approximately homogeneously.

The principle of the present device, which operates by running off the pieces to be measured, also makes it possible to count the waste products and carry out measurements concerning the surface contamination of each piece. To this effect, it is possible to carry out one measurement every ten centimeters.

Figure 3:
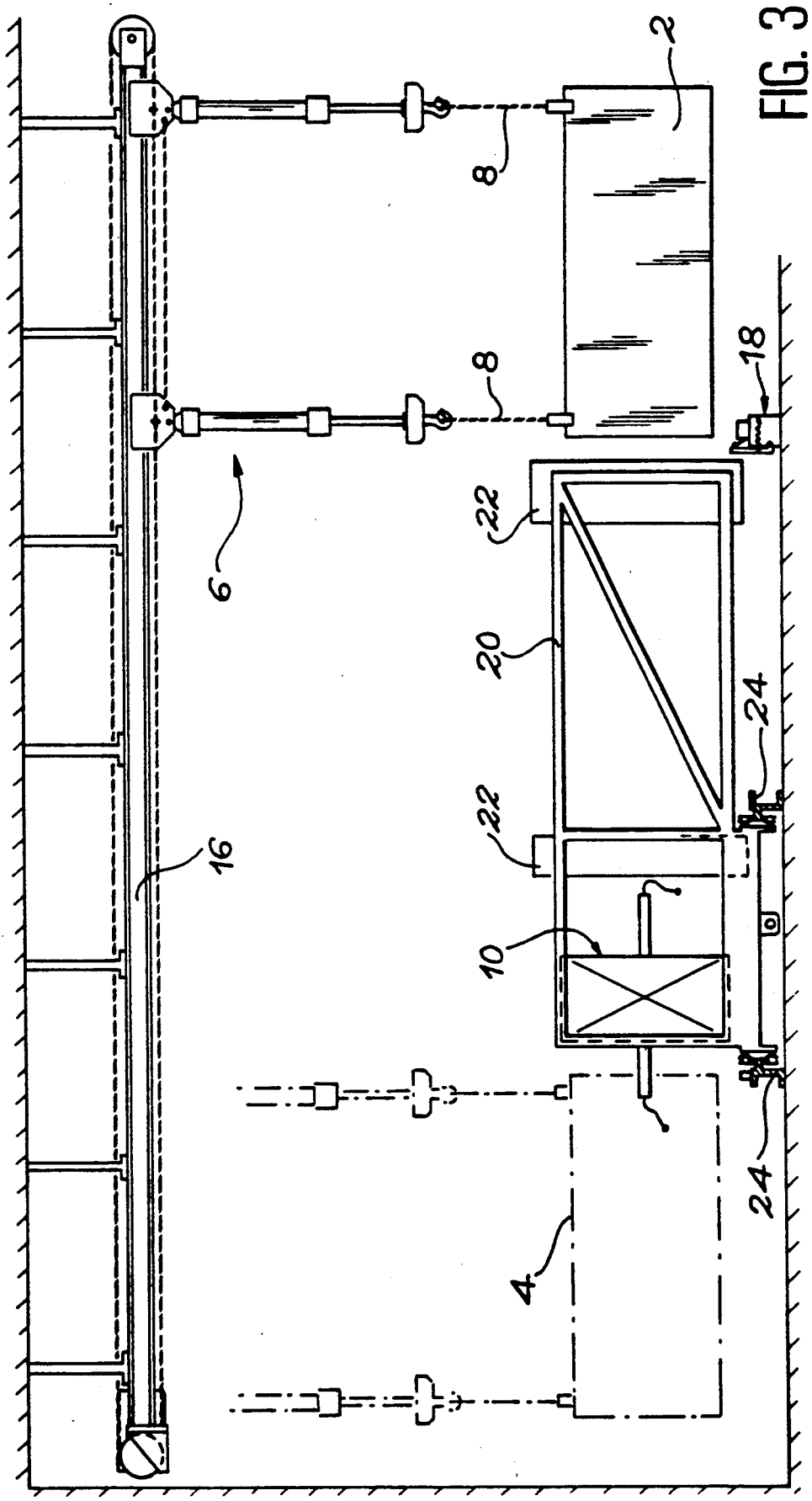
FIG. 3 is a longitudinal view of the device of the invention.

With reference to FIG. 3, the piece 2 or waste product is to be measured is again represented in the form of a steel sheet. It is shown in a first position with a marking 2 at the moment it starts its passage in the device of the invention. It is also shown on the left part of the figure by the dot-and-dash lines and marked 4 in the position where it ends its passage in the device.

The piece 2 or 4 is thus kept suspended with the aid of a lifting device 6 constituted by a motorized carriage equipped with two electronic scales whose two cables 8 are attached to the two ends of the piece 2 with the aid of self-locking pliers. In this system, the lifting device 6 is completed by a rolling bridge 16 enabling the piece to traverse the device of the invention. At the inlet of this device, a height gauge 18 is secured to the ground so as to check the vertical positioning of the piece 2 so that this piece does not rest inside the elements of the structure of the device present on the ground. A bearer structure 20 supports both the detection units 10A and 10B and the elements of the shape recognition system 22, the latter to be discussed in detail later. In this case, the detection units 10A and 10B amount to two, but additional detection units could also be used. The bearer structure 20 also constitutes the device for positioning the detection units 10A and 10B. To this effect, it is placed on lateral rails 24 placed parallel to one another on the ground and transversal to the bearer structure 20. They make it possible to move at least one of the detection units 10A and thus to transversally position the two detection units 10A and 10B with respect to each other according to the thickness of the piece 2.

Figure 4:
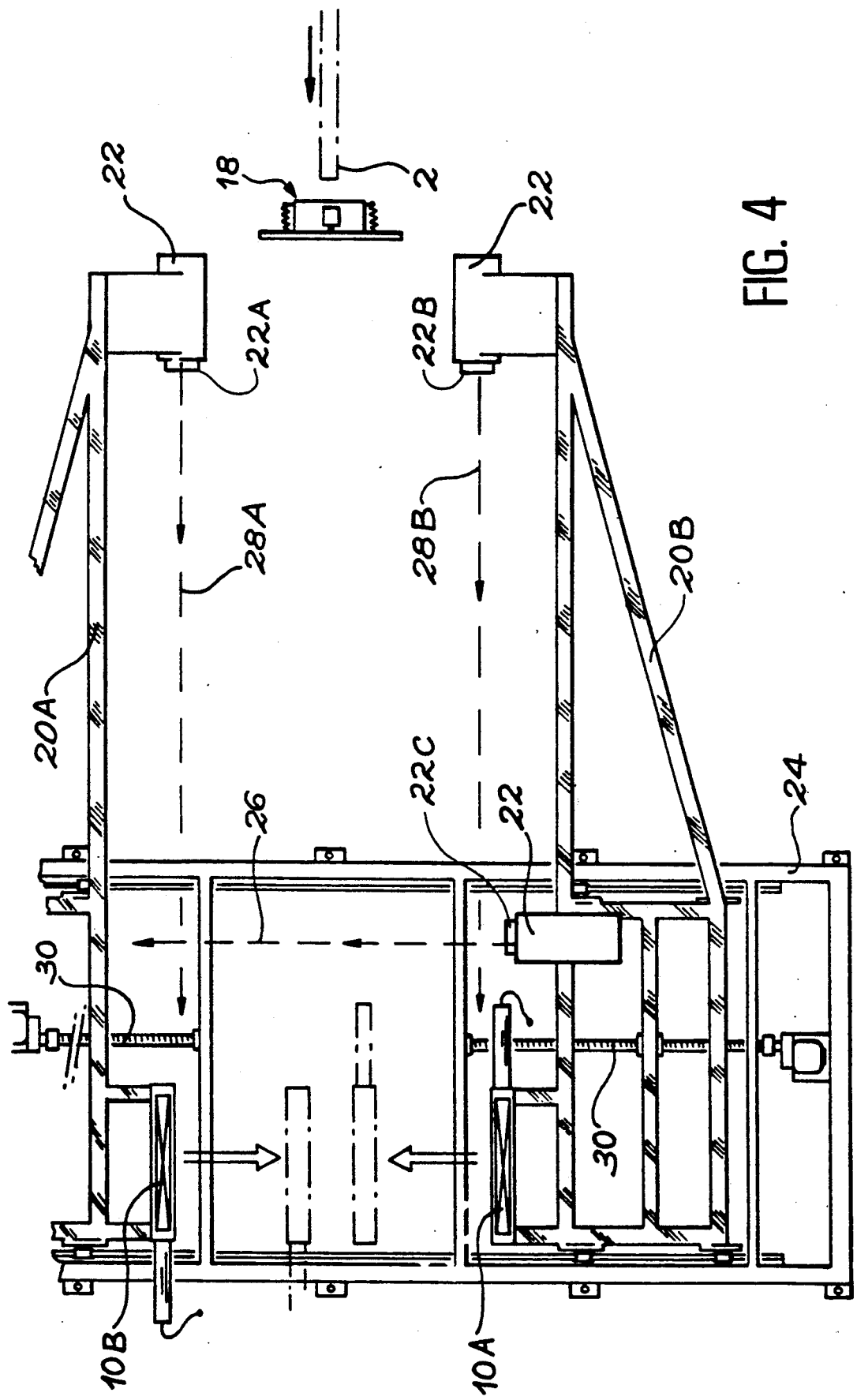
FIG. 4 is a top view of the device of the invention.

FIG. 4 illustrates the details of this installation. It shows the elements described on FIG. 3 and in particular the details of the bearer structure 20. A first section 20A of this structure is positioned at the extremity of the rails 24. The second section 20B is positioned in an intermediate position on the rails 24. Each of these two sections bears a detection unit 10A or 10B. This bearer structure 20 also supports the system 22 for recognizing the shape of the piece 2. One particular embodiment of the shape recognition system 22 is constituted by a first luminous clip-on lens 22C focused along line 26 situated on the path of the piece 2. Its role is to detect the presence of the piece to be measured. The recognition system 22 also includes two second luminous clip-on lenses 22A and 22B focused, respectively along lines 28A and 28B parallel to each other and perpendicular to the first clip-on lens line 26. They are each mounted on one section 20A or 20B of the bearer structure. Their function is to detect the presence of the piece in the direction of its width.

FIG. 4 also shows two endless screw systems 30 enabling the two sections 20A and 20B of the bearer structure to be moved.

The carrying out of one measurement may be effected as follows: the piece 2 is brought above the gauge 18 until it interrupts the first luminous clip-on lens line 26. Then it goes back by a known distance so as to free the luminous clip-on lens line 26.

The two sections 20A and 20B of the bearer structure are then brought close to each other with the aid of the endless screw systems 30 until each of the two clip-on lens lines 28A and 28B is interrupted by the walls of the piece 2 to be measured. The overall width of the piece is thus detected and the measuring units 10A and 10B may be pushed back by a selected distance by means of a slight spacing of the two mobile sections 20A and 20B so as to free the two clip-on luminous lens lines 28A and 28B. The shape recognition system 22 thus makes it possible for the computer to furnish the average surface activity. The movement of the piece towards the front firstly cuts the luminous clip-on lens line 26 via the front and then frees it via the rear, which makes it possible to know the length of the piece and adjust the measurement start and end.

A carriage for picking up the piece may be provided at the outlet of the device of the invention.

All the movements of the two sections of the bearer structure 20A and 20B are controlled by the computer which may be a microcomputer. This microcomputer may then carry out all the calculations relating to efficiency, the length of the piece, the shadow effect, the distance between the counters, attenuation and any resultant operational calculations.

What is claimed is:

1. Device to measure the radioactive contamination of objects via the detection of gamma radiations, wherein it includes:

at least two detection units each including a gamma radiation detector with a detection surface delivering a number of photons proportional to the number of gamma radiations detected, the two detectors being placed opposite and parallel to each other and spaced from each other by a distance able to be adjusted according to the width of the piece to be measured;

a device to position the detection units according to the piece to be measured and constituted by a bearer structure;

a system for lifting and moving the piece to be measured so as to have this piece pass between the two detection units and enabling the moving long pieces to be measured, and a system for recognizing the shape of the piece at the inlet of the two detection units constituted by a first luminous clip-on lens perpendicular to the distance covered by the piece and two second luminous clip-on lenses parallel to each other, perpendicular to the first luminous clip-on lens and each integral with one section of the bearer structure.

2. Device according to claim 1, wherein the detection units include a photoelectron multiplier receiving the photons of a detector delivering an electric signal characteristic of the measurement.

3. Device according to claim 2, wherein the two photoelectron multipliers are mounted head-to-tail.

4. Device according to claim 2, wherein it includes a computer to control the device and to process the electric measurement signal.

5. Device according to claim 4, wherein the computer includes means for taking into account the dimensional characteristics of the piece, as well as its thickness and the spacing of the detectors.

6. Device according to claim 4, wherein a radioactivity distribution profile is calculated by the computer according to the movement of the piece.

7. Device according to claim 4, wherein the computer furnishes the average surface activity on the basis of the data of the shape recognition system.

* * * * *

UNITED STATES PATENT AND TRADEMARK OFFICE
CERTIFICATE OF CORRECTION

PATENT NO. : 5,135,706

DATED : August 4, 1992

INVENTOR(S) : Costes et al.

It is certified that error appears in the above-identified patent and that said Letters Patent is hereby corrected as shown below:

On the title page: Item [75] Inventors, line 2, "Puyricord;" should be --Puyricard;--.

On the title page: Item [30] Foreign Application Priority Data, line 1, "89 12776" should be --89 13776--.

Column 1, line 24, after "(1 Bq/g)" insert --. In order--.

Column 4, line 66, after "respectively" insert --,--.

Signed and Sealed this

Thirty-first Day of August, 1993

*Attest:*

BRUCE LEHMAN

*Attesting Officer*  *Commissioner of Patents and Trademarks*